(12) United States Patent
Aben et al.

(10) Patent No.: US 9,561,525 B2
(45) Date of Patent: Feb. 7, 2017

(54) PROCESS FOR DEPOSITING AN ANTI-REFLECTIVE LAYER ON A SUBSTRATE

(75) Inventors: Gerardus Aben, Geleen (NL); Ronnie Bernardus Maria De Rijk, Geleen (NL); Patrick Wilhelmus Antonius Vrijaldenhoven, Geleen (NL)

(73) Assignee: DSM IP ASSETS B.V., Heerlen (NL)

( * ) Notice: Subject to any disclaimer, the term of this patent is extended or adjusted under 35 U.S.C. 154(b) by 22 days.

(21) Appl. No.: 13/982,339

(22) PCT Filed: Feb. 6, 2012

(86) PCT No.: PCT/EP2012/051943
§ 371 (c)(1),
(2), (4) Date: Oct. 15, 2013

(87) PCT Pub. No.: WO2012/107392
PCT Pub. Date: Aug. 16, 2012

(65) Prior Publication Data
US 2014/0030429 A1    Jan. 30, 2014

(30) Foreign Application Priority Data

Feb. 11, 2011 (EP) .................................. 11154184

(51) Int. Cl.
*G02B 1/11* (2015.01)
*B05D 5/06* (2006.01)
(Continued)

(52) U.S. Cl.
CPC ................. *B05D 5/061* (2013.01); *B05D 3/04* (2013.01); *C03C 17/007* (2013.01); *G02B 1/111* (2013.01);
(Continued)

(58) Field of Classification Search
CPC . G02B 1/11–1/118; B05D 1/18; C03C 17/002
(Continued)

(56) References Cited

U.S. PATENT DOCUMENTS

| 4,908,232 A | 3/1990 | Itou et al. |
| 5,639,517 A | 6/1997 | Floch et al. |

(Continued)

FOREIGN PATENT DOCUMENTS

| CN | 101384924 | 3/2009 |
| JP | 2009/210739 | 9/2009 |

OTHER PUBLICATIONS

International Search Report for PCT/EP2012/051943 mailed Mar. 14, 2012.

*Primary Examiner* — Elizabeth Burkhart
(74) *Attorney, Agent, or Firm* — Nixon & Vanderhye P.C.

(57) ABSTRACT

The present invention relates to a process for depositing an anti-reflective layer on a transparent flat substrate comprising the steps of providing a liquid coating composition comprising at least one solvent, at least one inorganic oxide precursor, and at least one pore forming agent; applying the coating composition to the substrate; drying the applied coating layer, and curing the coating layer; wherein during drying a gas flow is provided to the substrate at a flow rate of between 0.2 and 6 m/s. The advantage of this process is that defects visible in edge areas of the coated substrate can be significantly reduced.

13 Claims, 3 Drawing Sheets

(51) Int. Cl.
*B05D 3/04* (2006.01)
*C03C 17/00* (2006.01)
*G02B 1/111* (2015.01)

(52) U.S. Cl.
CPC ... *C03C 2217/425* (2013.01); *C03C 2217/732* (2013.01); *C03C 2218/113* (2013.01)

(58) Field of Classification Search
USPC .................................... 427/162, 164, 165
See application file for complete search history.

(56) References Cited

U.S. PATENT DOCUMENTS

| | | | |
|---|---|---|---|
| 2002/0094385 A1 | 7/2002 | Raychaudhuri et al. | |
| 2004/0037953 A1* | 2/2004 | Masuda et al. | 427/162 |
| 2006/0158076 A1* | 7/2006 | Kondou | G02B 5/3083 |
| | | | 313/110 |
| 2006/0181774 A1* | 8/2006 | Ojima et al. | 359/586 |
| 2006/0182945 A1 | 8/2006 | Yoneyama et al. | |
| 2008/0241373 A1* | 10/2008 | Oudard | 427/162 |
| 2009/0108487 A1* | 4/2009 | Suzuki | B29C 41/28 |
| | | | 264/171.1 |
| 2010/0015433 A1* | 1/2010 | Arfsten | C08K 3/36 |
| | | | 428/327 |
| 2010/0165467 A1* | 7/2010 | Thies | 359/599 |

* cited by examiner

PROCESS FOR DEPOSITING AN ANTI-REFLECTIVE LAYER ON A SUBSTRATE This application is the U.S. national phase of International Application No. PCT/EP2012/051943 filed 6 Feb. 2012 which designated the U.S. and claims priority to EP 11154184.3 filed 11 Feb. 2011, the entire contents of each of which are hereby incorporated by reference.

FIELD

The invention relates to a process for depositing an anti-reflective layer on a transparent substrate. More specifically, the invention relates to such a sol-gel process that comprises the steps of a) providing a liquid coating composition comprising at least one solvent, at least one inorganic oxide precursor, and at least one pore forming agent; b) applying the coating composition to the substrate; c) drying the applied coating layer; and d) curing the coating layer.

BACKGROUND AND SUMMARY

Anti-reflective (AR) coated substrates find use in many different applications, like cover sheets for framing art and photos, tv screens and other displays, lighting, architectural and horticultural glass, cover sheets for solar panels, etc. Numerous documents describe different processes for depositing an (AR) layer on a transparent substrate, applying various coating compositions. Especially for glass substrates, such processes often use sol-gel technology to provide a porous inorganic layer of about 80-200 nm thickness, that is about one-quarter of the wavelength of visible light. A single layer of such thickness and having a refractive index between that of the substrate (about 1.5 for glass) and air (about 1) will reduce the amount of light reflected from the substrate surface. Such anti-reflective layers may be applied to one or both sides of the substrate. An advantage of porous coating is that a single layer may suffice for reducing reflectance. In case of alternate techniques like sputtering or non-porous sol-gel layers, light reflection can be further decreased by applying multiple layers having different refractive indices.

A sol-gel process, also known as chemical solution deposition, is a wet chemical technique that is typically used for making a (porous) metal oxide layer starting from a solution or colloidal dispersion of an inorganic oxide precursor in a solvent (also called sol), which acts as precursor for an integrated network (or gel) of either discrete particles or network polymers. In such process, the sol gradually evolves to a gel-like diphasic system containing both a liquid and solid phase. Evaporation of at least part of the solvent (drying) is generally accompanied by shrinkage and densification, and affects final microstructure and porosity. Afterwards, a thermal treatment at elevated temperature is often needed to remove remaining solvent and other organics, and enhance further condensation reactions (curing) to result in mechanical and structural stability. Typical inorganic oxide precursors are metal alkoxides and metal salts, which undergo various forms of hydrolysis and condensation reactions. To increase porosity and pore size, pore forming agents may be added (in addition to solvent). In processes for making an anti-reflective layer on a substrate generally coating compositions are applied that have very low viscosity and comprise only low amounts of components that will form the final solid layer, e.g. a solids content of up to about 10 mass %. This means that in the sol-gel process significant amounts of fluid (solvent) need to be removed, which can lead to various problems; including premature evaporation.

In US2008/0241373A1 a process for making an AR coating on a substrate is described, comprising the steps of a) providing a liquid coating composition comprising a silica precursor, a polymeric glycol as pore forming agent, and at least two alcohols having different boiling points; b) applying the coating composition to the substrate; c) evaporating the alcohols from the applied layer; and d) heat curing the coating layer. It is indicated that by using a mixture of alcohols with different boiling points, solvent evaporation can be better controlled leading to improved process and product consistency.

Various known deposition techniques can be used to apply an AR layer on a substrate; including methods like spin-coating, dip-coating, spray-coating, roll-coating, slot die-coating, and the like. Both coating technique and coating composition can be fine tuned to reduce surface and other defects, and to result in a homogeneous layer of uniform thickness and properties.

A typical defect frequently observed in AR coatings is the appearance of a band along the edges of the substrate, especially in case of a flat or planar substrate like a glass or plastic plate or sheet, which band is visible as showing deviating light reflection and/or having a different hue than the remainder of the substrate's surface. In the text book "Sol-Gel Technologies for Glass Producers and Users", M. A. Aegerter and M. Mennig (Eds.), 2004, ISBN: 978-1-4020-7938-2, p. 44, it is indicated that such edge defects are process-related, and appear in a band of about 8-20 mm from the edge. This publication makes specific reference to a dip-coating process, but similar edge defects are also observed with other deposition processes. Although such edge defects appear to be common, only few publications address reducing or preventing them. Occurrence of such defects, however, does pose a problem in practice, for example in cover glass for art or picture framing, or for solar panels. Currently, it is not uncommon to cut away the edges having deviating optical properties. This is not possible, however, in case of thermally tempered glass.

There is thus a need in industry for an improved process for depositing an anti-reflective layer on a transparent flat substrate, which process results in a substrate showing a reduced area at the edges having defects, or showing less visible edge defects.

It is therefore an objective of the present invention to provide such an improved process.

The solution to the above problem is achieved by providing the process as described herein below and as characterized in the claims.

Accordingly, the present invention provides a process for depositing an anti-reflective layer on a transparent flat substrate comprising the steps of a) providing a liquid coating composition comprising at least one solvent, at least one inorganic oxide precursor, and at least one pore forming agent;
b) applying the coating composition to the substrate;
c) drying the applied coating layer; and
d) curing the coating layer to form an anti-reflective layer;
wherein during drying step c) a gas flow is provided to the substrate at a flow rate of between 0.2 and 6 m/s.

DETAILED DESCRIPTION OF DISCLOSED EMBODIMENTS

Figure 1:
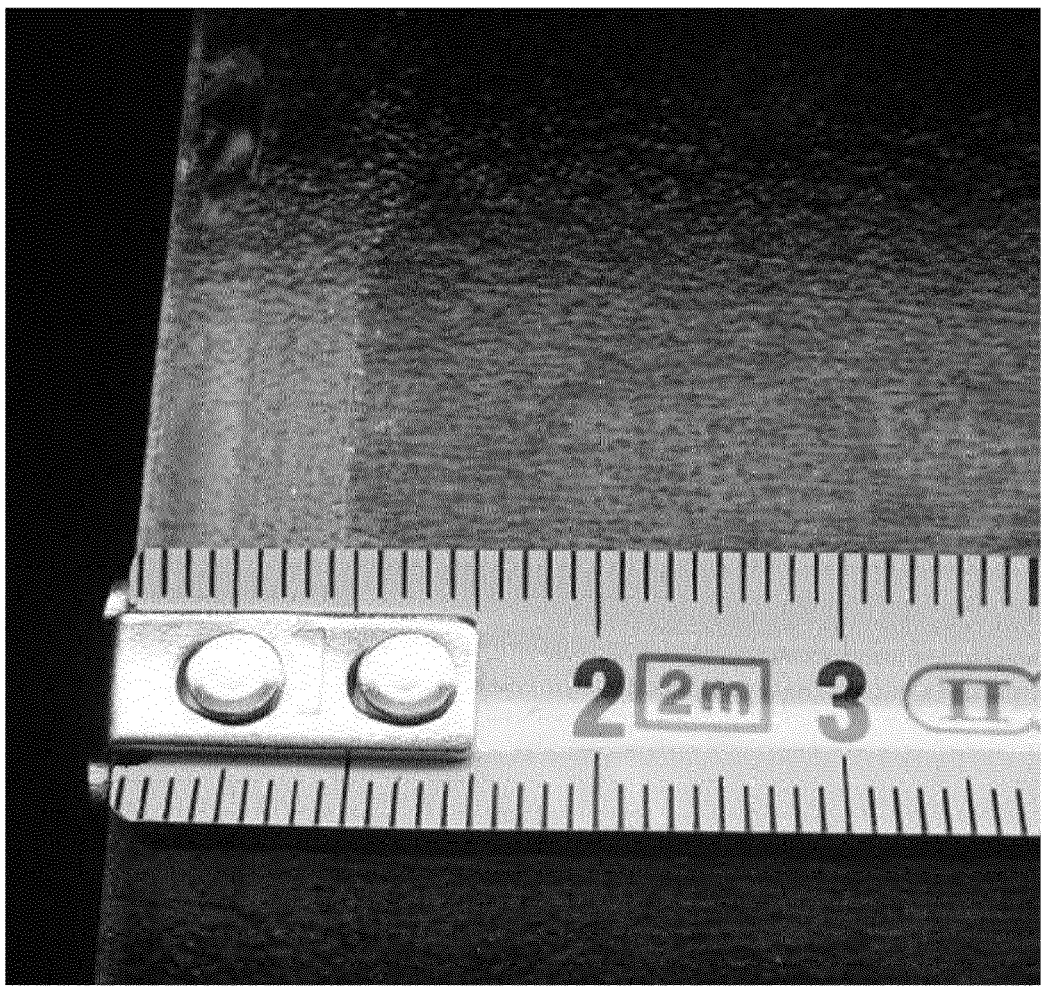
FIG. 1 is a photograph showing a bottom edge and (in black and white) obtained by the Comparative Experiment A (CE A) below.

Within the context of the present invention, it was surprisingly found that the process according to the invention results in a substrate provided with an AR coating that shows a reduced band along its edges having visually different appearance. More specifically, a flat substrate coated with a dip-coating process according to the invention showed significant reduction in edge bands, e.g. to a width of about 3-5 mm; whereas the rest of the surface showed homogeneous coating without defects.

In US2002/0094385A1 an apparatus is described that can be used to rapidly thermally heat and cure a sol-gel coating layer on a plastic substrate, without melting or deforming the plastic. This curing process uses a combination of heating with IR lamps and a heated gas stream of certain temperature and flow rate. This document, however, is silent on reducing coating defects by adjusting the drying step.

In the process according to the invention a gas flow is provided to the coating layer applied on the substrate at a specific flow rate. A minimum flow rate of about 0.2 m/s was found to be needed to result in a visual improvement, but too high a gas flow may result in other optical defects or surface inhomogeneities. Preferably, the gas is provided as a laminar gas flow, that is as a non-turbulent streamline flow with relatively steady velocity in parallel layers.

For these reasons, the average gas flow rate is preferably at least about 0.3, 0.5, 0.7, 0.9 or 1.0 m/s, but at most about 5.5, 5, 4.5, 4, 3.5, or 3 m/s.

Without intending to be bound to any theory, the inventors think that this moderate gas flow helps in steadily evaporating the solvents from the coating layer, especially also at the edge areas, where a thicker layer may result from surface tension of the coating composition at a relatively sharp substrate edge. In addition, also differences in solvent contents in the wet coating layer between edge and adjacent area would result in differences in surface tension, and in transport phenomena (for example via the Marangoni effect); resulting in deviating optical properties in an extended edge area. The process of the invention provides better control and reduction of such defect area.

Such gas flow in the process of the invention can be generated by either delivering gas via a suitable duct and openings or nozzles, or by withdrawing gas (air); as is known to a skilled person.

In the process according to the invention the gas flow may be provided across a full cross-sectional surface of the substrate, but the gas should specifically flow at least along the edges and adjacent area to reduce edge defects; preferably the gas flows at least over an area of about 25, 20, or 15 mm from the substrate edges. In a preferred way of operating the process according to the invention, gas flows are created at least locally at the edges. More preferably, such local flow is combined with a flow covering the surface over the full width of the substrate, resulting in a flow gradient with increased flow rate at edge areas, but within indicated limits. Typically in such process the substrate is moved or transported at a rate significantly smaller than the gas flow rate.

In a semi-continuous coating process, like a roll- or slot die-coating process, such gas flow is also provided continuously, preferably relatively close and in parallel to the roll- or die-applicator. In case higher or additional gas flow is generated at the edges, the gas flow is preferably directed towards the outside of the edges in order to prevent turbulence above the surface of the substrate. In such methods both continuous substrates, like a roll of plastic sheet, as well as discontinuous substrates, like a series of glass plates can be processed by moving through the coating equipment. In case of a continuous substrate only the 2 lateral edges are relevant in practice. In case of plates or sheets of certain size defects can occur at all 4 edges, and may be reduced by the air flow; the non-lateral edges often being most prone to edge defects.

In a dip-coating deposition process, wherein the coating composition is applied as a layer to the substrate by first submersing the substrate in a bath filled with the coating composition and subsequently pulling up from the coating bath at certain constant speed, the gas flow is provided at least during said pulling up. Due to gravity effects, formation of an edge band with defects is most prominent at the bottom edge (compared to top and lateral edges). For this reason, the bottom edge is preferably provided with a gas flow of higher flow rate. This can be done by temporarily increasing the flow rate, or by locally applying an additional gas flow during certain time.

In a preferred embodiment, the present invention relates to such a dip-coating process, wherein a laminar gas flow is provided top down along the full width of the substrate during pulling up the substrate, and wherein optionally an additional gas flow is provided to the lower part shortly after leaving the coating bath.

Preferably, in the process according to the invention the applied gas is chemically inert towards the coating composition, and has been filtered to remove any particles that may negatively affect the coating quality. The gas flow is thought to mainly control evaporation of solvent(s) from the applied coating layer. Any suitable gas composition can be used, as known to a skilled person. Examples include gasses like nitrogen or mixtures comprising nitrogen. Preferably, the gas is air with a relative humidity of at most 70%, more preferably at most 60, 50, 40, 30 or 20%. A low humidity of the passing air flow will favour controlling evaporation of solvent, including water, from the coated substrate, and further reduce edge defects.

The temperature of the gas is not specifically critical, as long as it is constant. A constant temperature is also important in the process in general, e.g. of the coating bath, in order to secure a constant and reproducible drying of the coating.

Preferably, in the process according to the invention the gas has a temperature somewhat higher than the substrate and coating bath (which is also the temperature of the coating composition at the time of deposition), which will enhance solvent evaporation. More preferably, said gas temperature is at most about 25° C. higher for a stable process and homogeneous AR layer; even more preferably at most about 20, 15, 10 or 5° C. higher. In a preferred embodiment, the gas flow has substantially the same temperature as the coating bath. The temperature of the coating bath is typically in the range 10-50° C., preferably 15-35° C.

In the process according to the invention the gas flow aids in drying of the applied coating layer. The skilled person will be able to find a suitable combination of conditions, like gas composition, flow rate, temperature and time of gas flow over the substrate, by doing some experiments; for example by observing visually the effect on the coating layer (dryness, homogeneity, etc.).

In the process according to the invention an anti-reflective layer is deposited on a transparent flat substrate. Suitable substrates include inorganic glasses (e.g. borosilicate glass, soda lime glass, glass ceramic, aluminosilicate glass), organic plastics (e.g. PET, PC, TAC, PMMA, PE, PP, PVC and PS), and composite materials like laminates.

Liquid coating compositions that can be used for depositing an anti-reflective layer on a transparent substrate have been described in many publications. In principle the process according to the invention can use any such coating composition as further described in cited documents and herein. Early publications on suitable sol-gel coatings include U.S. Pat. Nos. 2,432,484 and 2,474,061.

The process according to the invention uses a liquid coating composition that comprises at least one solvent. With solvent is meant a liquid component that contains the other coating components in dissolved, or dispersed or colloidal states, and could thus also be referred to as diluent. The solvent mainly determines the viscosity of the coating composition, which is relatively low to allow application in thin films. Typically the viscosity of the optical coating formulation is about 0.2 mPa·s or more, preferably 1.0 mPa·s or more and even more preferably about 2.0 mPa·s or more. Generally, the viscosity is about 100 mPa·s or less, preferable about 10 mPa·s or less, more preferably about 6.0 mPa·s or less, and even more preferred about 3.0 mPa·s or less. The viscosity can be measured with an Ubbelohde PSL ASTM IP no 1 (type 27042).

Considering the sol-gel chemistry, suitable solvents are miscible with water or can at least dissolve a certain amount of water. Examples include organic solvents like ketones, esters, ethers, alcohols, and mixtures thereof. Preferably the solvent is an alcohol, more preferably a lower aliphatic alcohol like methanol, ethanol, propanol, or butanol. Ethanol and isopropanol are particularly preferred solvents.

The process according to the invention uses a liquid coating composition that comprises at least one inorganic oxide precursor, which upon drying and especially curing the composition will form a film and can act as binder material for particles that may be present in the coating, giving mechanical properties to the AR layer and adhesion to the substrate. Such coating compositions have been described in many publications, including the documents cited in this application, and publications referenced therein. The inorganic oxide precursor can be an inorganic metal salt or an organo-metallic compound, preferably a metal alkoxide, and combinations thereof. Within the present application silicium (Si) is considered to be a metal. Suitable metals include Si, Al, Ti, Ta, Nb and Zr, and mixtures thereof. Preferred precursors include Si alkoxides like tetramethoxysilane (TMOS), tetraethoxysilane (TEOS), methyltrimethoxysilane, methyltriethoxysilane, titanium tetraisopropoxide, aluminium nitrate, aluminium butoxide, yttrium nitrate and zirconium butoxide. Such compounds can have been pre-reacted or pre-hydrolysed to form oligomeric species, typically in the form of nano-sized particles. More preferably, the at least one precursor comprises TMOS and/or TEOS.

The coating composition used in the process according to the invention further contains at least one pore forming agent, which helps in generating suitable porosity in the final AR layer to provide the desired refractive index. The coating composition already contains solvent and organic ligands from organo-metallic precursor compounds. These compounds as such will already induce some porosity to the inorganic oxide layer. Preferably the composition comprises additional pore forming agents to enhance and control porosity and pore sizes. Suitable pore forming agents include organic compounds like higher boiling (i.e. less volatile) solvents, surfactants and organic polymers, and inorganic particles having sub-micron particle size, i.e. nano-particles.

Organic compounds as pore forming agent may in initial stages after applying the coating to the substrate be present in dissolved, dispersed or other form. After drying and/or curing the coating, these compounds can be removed; for example by evaporation or exposing the coating to a solvent for the polymer and extracting the polymer from the coating. Alternatively, the pore former can be removed during thermally curing the coating at temperatures above the decomposition temperature of the compound or organic polymer. Suitable temperatures are from 350 to 900° C., preferably above 450, 500, 550 or 600° C. A combined treatment of dissolving and degrading/evaporating the compound, like a polymer, may also be applied.

Suitable polymers include those that can be removed from the coating, and provide the desired pore size of about 50-150 nm. Examples include styrenic, acrylic and olefinic polymers, including homopolymers and various copolymers. In U.S. Pat. No. 4,446,171 various suitable organic polymers are described, including PMMA, nitrocellulose, cellulose acetate butyrate, polyvinyl alcohol, and a hydroxyl-functional acrylic copolymer. Polyvinyl acetate was applied in U.S. Pat. No. 5,858,462. In EP0835849 and US2008/0241373 polyethylene oxide was used as pore former.

In the process according to the invention also inorganic nano-particles can be used as pore forming agent in the coating composition. Suitable nano-particles comprise at least one inorganic or metal oxide or fluoride, or inorganic or metal oxide or fluoride precursor. Examples of suitable particles are particles comprising lithium fluoride, calcium fluoride, barium fluoride, magnesium fluoride, titanium dioxide, zirconium oxide, antimony doped tin oxide, tin oxide, aluminum oxide, and silicon dioxide. Preferably, the metal oxide is alumina or silica. Preferably, the particles comprise silica, more preferably particles comprise at least 60 mass %, even more preferably at least 80 and most preferably at least 90 mass % silica.

The nano-particles preferably have an average particle size g of below 500 nm, more preferably below 250, 125, 100, or 50 nm. Particle size g is defined as 0.5×(length+width) for non-spherical particles and as the radius for spherical particles. Preferably, the average particle size is 5 nm or more, more preferably above 7 or above 10 nm. The sizes of the particles may be determined by spreading a dilute suspension of the particles over a surface and measuring the sizes of individual particles by using microscopic techniques, preferably scanning electronic microscopy (SEM) or atomic force microscopy (AFM). Preferably the average sizes are determined by measuring the sizes of 100 individual particles.

The nano-particles may be solid, porous, or hollow. In case of solid particles, porosity in the coated layer results from the space between the non-ideally packed particles not being completely filled by the inorganic oxide binder. Preferably, particles of different shapes, or of different particle size distributions are used. Examples of such coatings are for example described in U.S. Pat. No. 2,432,484 and EP1430001, and documents cited therein. Use of porous nano-particles in the coating composition will further contribute to controlling porosity in the cured coating.

In a preferred way of performing the process according to the invention, hollow metal oxide nano-particles are used as pore forming agent. Preferably, the particles have a void size larger than 5 nm, more preferably larger than 10, 20 or 30 nm. Preferably, the hollow core is smaller than 500 nm, more preferably smaller than 250, 125, 100, or even 50 nm. Suitable particles and coating compositions are a.o. described in US20060182945.

The coating composition can also comprise core-shell nano-particles with a metal oxide shell and an organic core, which core can be removed—similarly to the organic polymer during curing of the coating as described above—to result in hollow particles embedded in the coating layer. Preferably, the size of the organic core is similar to the size of the hollow particles described earlier. The organic core is preferably an organic polymer, like those described above, which can be removed by solvent extraction, or by thermal degradation and evaporation.

Suitable core-shell particles have been described in numerous publications, including U.S. Pat. Nos. 5,100,471, 6,685,966, WO2008028640, WO2008028641, and WO2009030703, and documents cited therein.

In the process according to the invention the coating composition can be applied to the substrate with various deposition techniques, as known to a skilled person. Suitable methods include discontinuous methods like spin-coating and dip-coating, as well as continuous methods like spray-coating, roll-coating, slot die-coating, and the like. Preferred methods are dip-coating, roll-coating and slot die-coating. The thickness of the wet coating layer to be applied depends on the amount of solid film forming compounds in the coating, and on the desired film layer thickness after subsequent drying and curing. The skilled person will be able to select appropriate conditions depending on the situation.

In the process according to the invention the steps of drying and curing the applied coating composition will comprise evaporating the solvent(s) and other volatile components, and then reacting the precursor to form inorganic oxide(s), and removing the pore forming agent.

Drying preferably takes place under ambient conditions (e.g. 23±2° C. and less than 70% relative humidity), although elevated temperatures (e.g. up to about 80° C., more preferably up to 60, 50 or 40° C.) may also be used to shorten the total drying time. Specific drying conditions may be determined by a person skilled in the art based upon the solvent or diluent to be evaporated.

After drying, i.e. after substantially removing volatile components, the coated substrate is preferably cured. Curing conditions are depending on the coating composition and curing mechanism, and on the type of substrate. For example, in case of a glass substrate curing can be performed at relatively high temperatures; for example up to the softening temperature of the glass. This has the advantage that also organic compounds still present in the coating layer, like organic polymers as pore forming agent present as such in the coating or in a core-shell particle, can be thermally removed. A further advantage is that curing can be combined with a glass tempering step; i.e. heating the glass to above about 630° C. followed by quenching, to result in toughened or safety glass.

In case the substrate is an organic polymer, curing temperature is limited to below the melting or softening point of the semi-crystalline or amorphous polymer, or should take place in a very short time. Based on the specific case, the skilled person will be able to determine suitable conditions.

The invention will be further elucidated with the following experiments.

COMPARATIVE EXPERIMENTS A

A glass sheet of 50×50 cm and 3.2 mm thickness having structured (satin) surfaces is dip-coated by immersing in a container of 13 dm$^3$ containing about 5 dm$^3$ of a liquid coating composition, commercially available as KhepriCoat (DSM Functional Coatings BV, NL). This coating composition basically contains core-shell particles of average size about 120 nm (measured by dynamic light scattering (DLS) in wet state) having a silica shell around an acrylic copolymer core as pore forming agent, an inorganic oxide precursor comprising pre-hydrolysed TEOS as binder, and isopropanol as main solvent constituent. The composition contained about 3 mass % of solids and had pH of about 2. The coating bath was kept at ambient conditions, i.e. about 21° C. and 32% relative humidity. The sheet was then vertically pulled up from the bath at a rate of 6.0 mm/s. The coated sheet was subsequently dried at ambient conditions for about 5 minutes, and then cured at 600° C. in an air circulation oven during 4 minutes.

A distinct band of about 9-10 mm width having clearly different reflection was apparent at the bottom edge of the sheet, visible as showing different colours versus the homogeneous blue hue for the rest of the surface. The lateral edges showed a similar band, but of smaller size and with less 'sharp' transition. In FIG. 1 a photograph is reproduced, showing the bottom edge band (in black and white). Some experiments were performed wherein the sheet was pulled up under a small angle, but such tilting was not found to significantly affect the edge effect.

COMPARATIVE EXPERIMENT B

CE A was repeated, but now the container was completely filled with the coating liquid. Again a distinct band was visible, but now it had a width of about 8 mm. A possible explanation for this 20% reduction may that in the partly filled bath of CE A evaporated isopropanol at least partly replaced air in the bath, which static and saturated atmosphere will retard evaporation of solvent from the applied coating. In the present experiment evaporating solvent will be easier removed from the coating surface.

COMPARATIVE EXPERIMENTS C AND EXAMPLES 1-3

These series of experiments were performed following the procedure as in CE B, but now forced air flows were created using a fan positioned at different distances and angles to the sheet being pulled up from the bath, resulting in different air flow rates and regimes.

Figure 2:
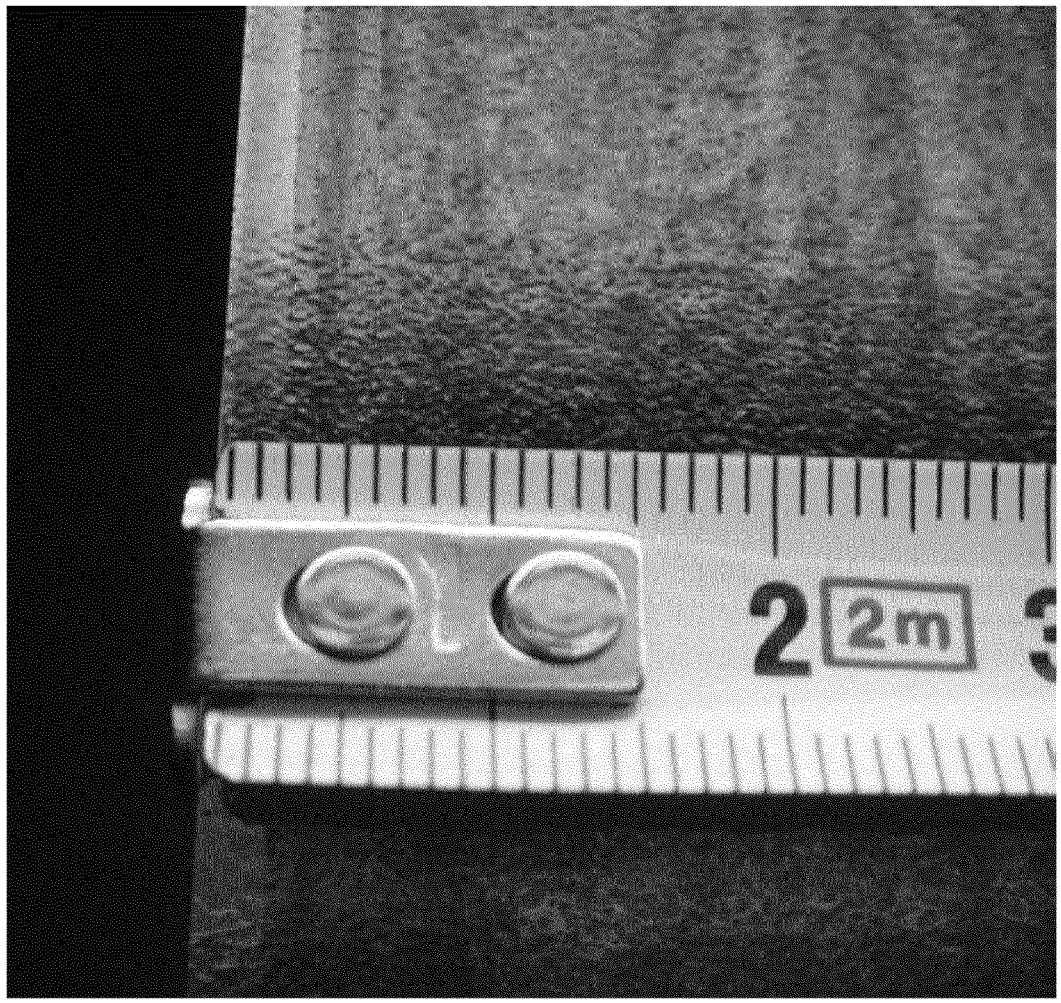
FIG. 2 is a photograph showing the effects of high air flow rate in accordance with Comparative Experiment C (CE C) below.

It was found that applying an air flow could significantly reduce the edge band, but also that too high flow rate induced other defects on the sheet. This is visualized in FIG. 2 for CE C, wherein the fan produced an air flow rectangular to the sheet in downward direction, with estimated air flow rate of about 8 m/s. This air flow resulted in some turbulence and the surface of the coating liquid in the bath being irregular, and a wavy pattern visible on the coated glass sheet.

By placing the fan at larger distance and decreasing air flow rate, gentle downward laminar flow and steady process conditions could be obtained, resulting in coated sheets showing homogeneous surface and a bottom edge band having widths as low as 3 mm. Air flow rates in these situations were measured to be between 0.5 and 3 m/s.

Figure 3:
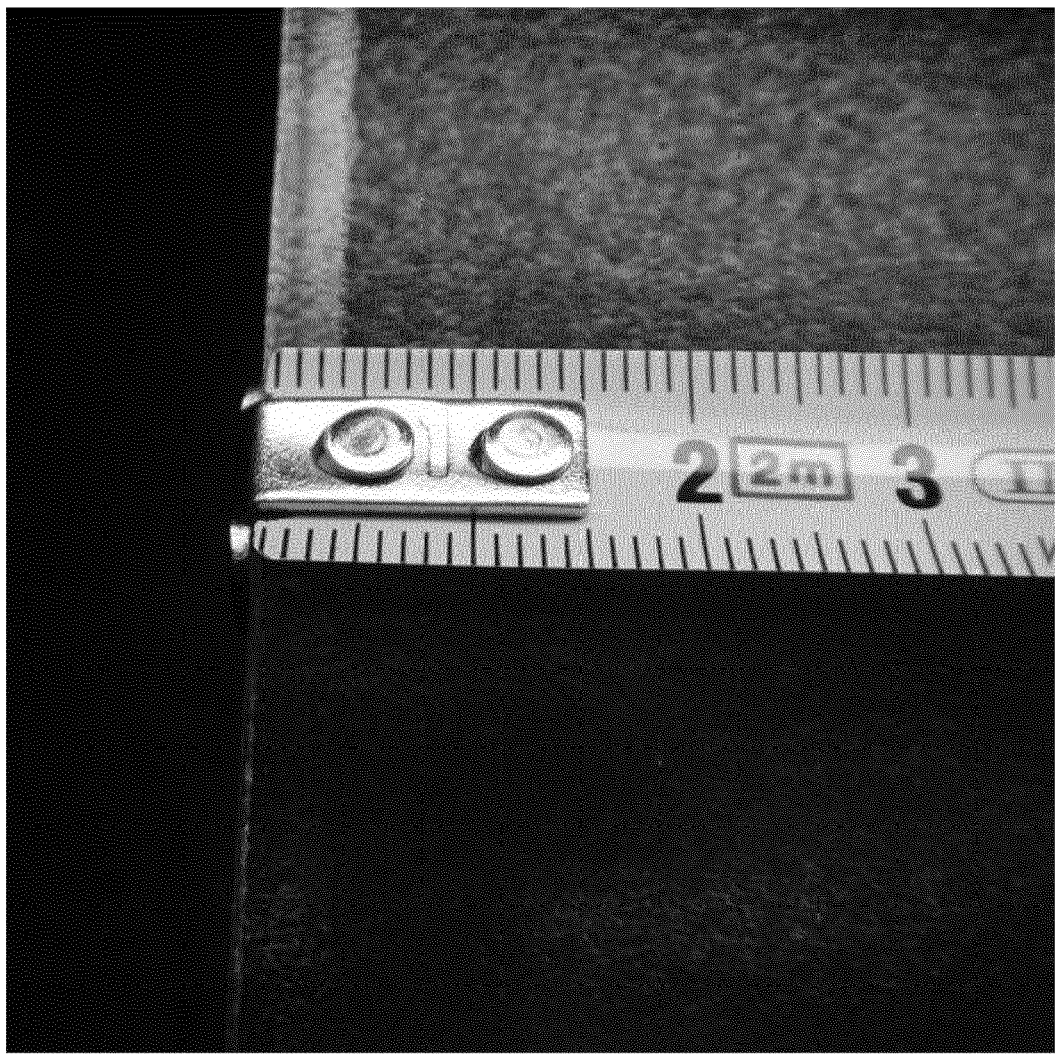
FIG. 3 is a photograph showing a sheet in accordance with Example 1 below.

Example 1 in FIG. 3 represents a photograph of a sheet showing the bottom edge having a band with width of about 4 mm.

It was noted that such band reduction occurred on both sides of the sheets, be it that the 'back' side, that is the side not directly facing the applied air flow, generally displayed a band of about 1 mm larger width. Directing the air flow to the sheet shortly after leaving the liquid bath was found to reduce edge bands on both sides.

It is noted that in practice an edge band of about 4 mm is acceptable in many applications; especially if the coated glass is 'framed' and outer edges are typically covered by framing material (for example in photo frames and solar modules).

Example 2 represents repeating experiments like Ex. 1 on another day, when relative humidity was about 25%. It was noticed that band widths observed were consistently smaller than before, typically down to about 1 mm.

In Example 3 experiment CE A, with the container being partly filled with coating liquid was repeated, but now applying an air flow as in above examples. Reduction of the edge band to about 4-5 mm was observed also in such case.

The invention claimed is:

1. A process for depositing an anti-reflective layer on a transparent flat substrate comprising the steps of:
    a) providing a liquid coating composition having a solids content of up to about 10 mass % and comprising at least one solvent, at least one inorganic oxide precursor, and a core-shell nano-particle with a silica shell and an organic core as a pore forming agent;
    b) applying the coating composition onto a transparent flat glass plate or sheet as a substrate to thereby form a coating layer on the substrate between edges thereof;
    c) drying the applied coating layer on the substrate at a drying temperature of ambient conditions or up to 80° C. by providing a flow of gas at a gas flow rate range of between 0.5 and 6 m/s to the coating layer at least along the edges of the substrate and an area adjacent the edges of the substrate; and
    d) curing the coating layer on the substrate at a curing temperature of from 350° C. to 900° C.

2. The process according to claim 1, wherein the flow of gas is provided as a laminar flow of gas.

3. The process according to claim 1, wherein the gas flow rate is between 1 and 3 m/s.

4. The process according to claim 1, wherein the flow of gas flows at least over an area of about 25 mm from the edges of the substrate.

5. The process according to claim 1, wherein the gas is air with a relative humidity of at most 50%.

6. The process according to claim 1, wherein the gas has a temperature of at most 25° C. higher than the substrate.

7. The process according to claim 1, wherein the solvent is an alcohol.

8. The process according to claim 1, wherein the inorganic oxide precursor comprises a metal alkoxide.

9. The process according to claim 1, wherein step b) is practiced by applying the coating composition to the substrate with a dip-coating, roll-coating or slot die-coating method.

10. The process according to claim 1, wherein step (c) is practiced by providing a local flow of gas at the edges of the substrate combined with a flow of gas covering a full width of the substrate to thereby establish a gas flow gradient with increased flow rate at the edges of the substrate but within the gas flow rate range of 0.5 and 6 m/s.

11. The process according to claim 10, wherein step b) comprises dip-coating the substrate by submersing the substrate into a coating bath comprising the coating composition, and thereafter withdrawing the substrate from the coating bath while drying the applied coating layer applied to the substrate according to step c).

12. A process for depositing an anti-reflective layer on a transparent flat glass plate or sheet comprising the steps of:
    (a) providing a flat glass plate or sheet as a substrate for coating having opposed lateral edges and opposed top and bottom edges;
    (b) providing a coating bath comprising a liquid coating composition having a solids content of up to about 10 mass % and comprising at least one solvent, at least one inorganic oxide precursor, and a core-shell nano-particle with a silica shell and an organic core as a pore forming agent;
    (c) dip-coating the substrate with the coating composition by submersing the substrate into the coating bath, and withdrawing the substrate from the coating composition at a substantially constant withdrawal speed to thereby coat the coating composition onto the substrate to thereby form a coating layer on the substrate between the lateral, top and bottom edges thereof;
    (d) drying the applied coating layer on the substrate while withdrawing the substrate from the coating bath at a drying temperature of ambient conditions or up to 80° C. by:
        (d1) providing a non-turbulent streamline flow of gas in parallel layers with a relatively steady velocity of a gas flow rate range of between 0.5 and 6 m/s to the coating layer at an area locally along at least the lateral edges of the substrate;
        (d2) providing a flow of gas covering a full width of the substrate between the lateral edges of the substrate to thereby establish a gas flow gradient across the full width of the substrate such that an increased flow rate of the gas is locally provided at the lateral edges of the substrate within the gas flow rate range of 0.5 and 6 m/s; and
        (d3) providing a flow of gas at a flow rate higher than the gas flow rate range of 0.5 and 6 m/s locally along the bottom edge of the substrate when the bottom edge of the substrate is withdrawn from the coating bath; and thereafter
    (e) curing the coating layer on the substrate at a curing temperature of from 350° C. to 900° C.

13. The process according to claim 12, wherein step (d3) comprises providing a gas flow at an increased flow rate along the bottom edge of the substrate or locally applying an additional gas flow along the bottom edge of the substrate for a predetermined time period.

* * * * *